United States Patent [19]

Nishimura

[11] Patent Number: 5,019,685
[45] Date of Patent: May 28, 1991

[54] DISCHARGE WORKING MACHINE

[75] Inventor: Hideo Nishimura, Fukui, Japan

[73] Assignee: Sodick Co., Ltd., Yokohama, Japan

[21] Appl. No.: 386,118

[22] Filed: Jul. 28, 1989

[30] Foreign Application Priority Data

| Apr. 13, 1989 | [JP] | Japan | 1-94242 |
| Apr. 13, 1989 | [JP] | Japan | 1-94243 |
| Apr. 13, 1989 | [JP] | Japan | 1-94244 |
| Apr. 13, 1989 | [JP] | Japan | 1-94245 |
| Apr. 13, 1989 | [JP] | Japan | 1-94246 |
| Apr. 13, 1989 | [JP] | Japan | 1-94247 |

[51] Int. Cl.⁵ .................. B23H 1/02; H01B 11/18; H05K 9/00
[52] U.S. Cl. .................. 219/69.13; 174/32; 307/89
[58] Field of Search ............ 219/69.13, 69.18; 323/208, 209, 210; 174/32, 33, 34, 71 C; 307/89, 147; 329/414, 415, 416, 417; 333/12, 1, 4, 5, 26, 245

[56] References Cited

U.S. PATENT DOCUMENTS

| Re. 17,235 | 3/1929 | Kirke et al. | 174/33 |
| 3,348,015 | 10/1967 | Rhyner et al. | 219/69.13 |
| 4,491,713 | 1/1985 | Patton et al. | 219/69.13 |
| 4,516,009 | 5/1985 | Inoue | 219/69.18 |
| 4,822,956 | 4/1989 | Sepe | 174/71 C |

FOREIGN PATENT DOCUMENTS

| 57-1617 | 1/1982 | Japan | 219/69.13 |
| 59-73226 | 4/1984 | Japan | 219/69.13 |
| 60-62415 | 4/1985 | Japan | 219/69.13 |
| 219518 | 9/1986 | Japan | 219/69.12 |

Primary Examiner—Geoffrey S. Evans
Attorney, Agent, or Firm—Cushman, Darby & Cushman

[57] ABSTRACT

A discharge working machine in which a working current is supplied from a power source to a working electrode and a workpiece by a core wire of a coaxial cable and a current flowing in the opposite direction to a current flowing through the core wire flows into a shield of the coaxial cable.

22 Claims, 8 Drawing Sheets ular reference to FIG. 1.

DISCHARGE WORKING MACHINE

BACKGROUND OF THE INVENTION

1. Field of Invention

The present invention relates to a discharge working machine which supplies a work current from a power source to a work electrode and a workpiece.

2. Description of the Prior Art

FIG. 14 shows a schematic representation of a prior art discharge device. This discharge working machine is adapted to supply a discharge work current from a power source PSO through a diode D, a transistor TO and a coaxial cable CC to a work electrode E and a workpiece W.

A power supply device including power source PSO, diode D, and transistor TO is connected to a main body of the discharge working machine including work electrode E and workpiece W, by coaxial cable CC. The coaxial cable CC helps to decrease the inductance between the power supply device and the discharge working machine main body, thereby enhancing working speed.

The above-mentioned conventional discharge working machine has, in the main body thereof, a connection interposed between the workpiece W and work electrode E. Because coaxial cable CC cannot be used in this portion, a single wire SW has been conventionally used as the connection in this portion. In fact, in the connective portion interposed between the work electrode E and workpiece W, nothing but the single wire SW can be used.

A drawback exists in this structure that when a discharge work current flows through the single wire SW, an inductance is generated in the above-mentioned single wire SW. Because of the inductance, the rise time of the discharge work current signal is lengthened, and the peak value of the discharge current is reduced. This deteriorates the working speed of the machine.

In order to increase the working speed, the power supply PSO voltage must be increased, resulting in a larger consumption of electric power.

In addition, as the size of the discharge working machine is increased, the above-mentioned single wire SW must have a greater capacity, and must be enlarged. A larger wire can cause the working speed to decrease even further. Furthermore, the performance of various discharge working machines (i.e., working speed, etc.) will vary depending on the size of the machine, and cannot be expected to be constant.

SUMMARY OF THE INVENTION

The present invention aims at eliminating the drawbacks found in the above-mentioned prior art apparatus.

Accordingly, it is an object of the invention to provide a discharge machine which is capable of increasing the working speed, reducing the power consumption, and providing a constant working speed even when the characteristics of the discharge working machine are varied.

In order to attain the above object, the present invention proposes a discharge working machine in which a working current is supplied from a power source through a core wire of a coaxial cable to a working electrode and a workpiece, and a current opposite to the current flowing in the core wire is generated in the shield of the coaxial cable to thereby increase the working speed. Or for the same working speed, power consumption can be reduced, and the working speed can be held constant even if the characteristics of the discharge working machine are varied.

BRIEF DESCRIPTION OF THE DRAWINGS

The exact nature of this invention, as well as other objects and advantages thereof, will be readily apparent from consideration of the following specification and drawings. Like reference characters are similarly designated throughout the figures, wherein.

DETAILED DESCRIPTION OF THE PREFERRED EMBODIMENT

A detailed description will hereunder be given of the preferred embodiments of the discharge working machine according to the present invention with reference to the accompanying drawings.

Figure 1:
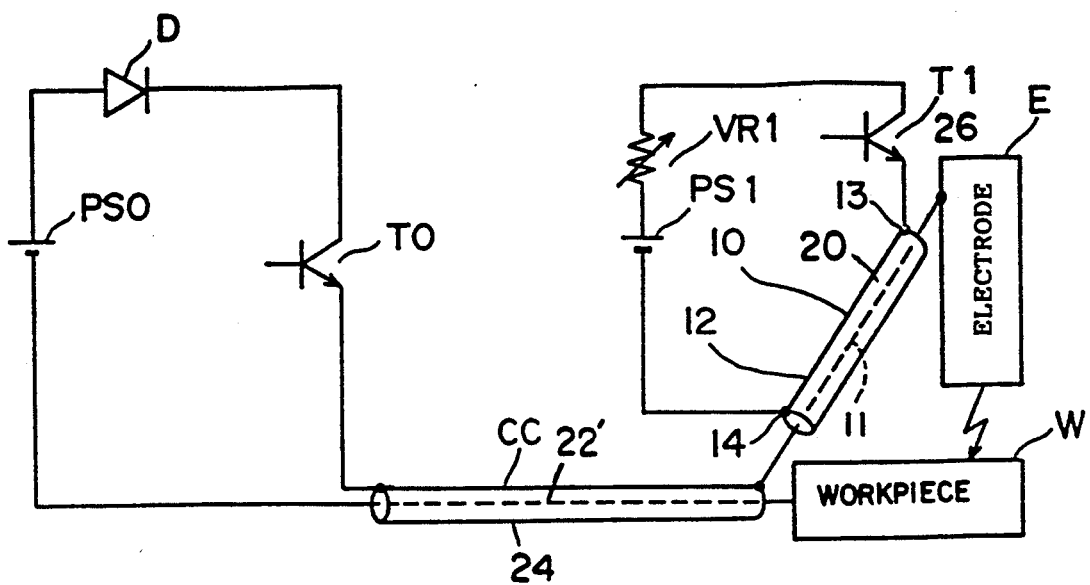
FIG. 1 is a circuit diagram of an embodiment according to the invention.

Referring first to FIG. 1, there is illustrated a circuit diagram of an embodiment of a discharge working machine constructed according to the invention.

In this embodiment, instead of a single wire SW which has been used in the prior art apparatus, there is provided a coaxial cable 10 which comprises a core wire 11, a shield 12 and an insulator 20 for insulating between the core wire 11 and shield 12. In order to produce the advantages of the present invention, the present invention uses a structure in which a first current known as a discharge working current flows through the core wire 11 in a first direction while a second current flows through the shield 12 in the opposite direction of the discharge working current.

The stray inductance caused in the cable by the current flow in one direction is therefore, at least partially, cancelled out by the current flow in the opposite direction.

The core wire 22 of first coaxial cable CC is connected to a workpiece W, and the shield of the first coaxial cable CC is connected to the core wire 11 of the second coaxial cable 10, which is in turn connected to a working electrode E. Power source PS1 is provided separately from a power source PSO, and is connected in series to variable resistor VR1 transistor T1, and the shield 12 of the coaxial cable 10. The power source PS1 and transistor T1 are oriented such that a second current from the power source PS1 is passed through transistor T1 to flow in the direction opposite to the direction of a working current flowing through the core wire 11.

The transistor T1 is adapted to turn on and off repeatedly in synchronization with the operation of transistor T0.

In operation, the workpiece W is discharge-operated by repetitive turning on and off so that discharge pulses are applied between the working electrode E and the workpiece W. The transistor T1 turns on and off repetitively with the same pulse width and at the same frequency as the on and off cycles of the transistor T0. An oscillator, or any other known controlling means may be used for this purpose. The bases of both transistors can be simultaneously driven by this controlling means.

Figure 3:
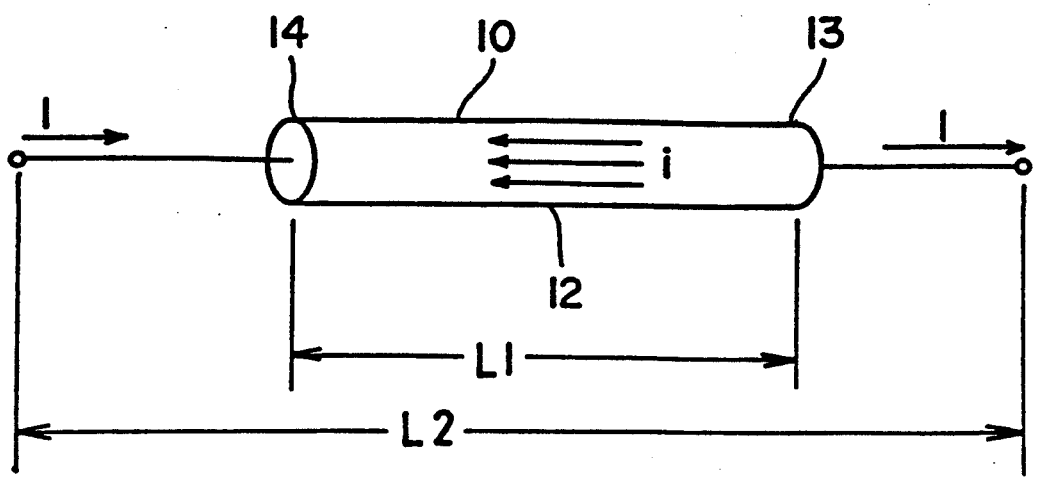
FIG. 3 is an explanatory view used to illustrate the operation of the above-mentioned embodiments.

The discharge starts when the transistor T0 is turned on. At this time the working current is allowed to flow toward the working electrode E from the coaxial cable CC. Since the transistor T1 is also on at this time, the second current is allowed to flow from the leading end 13 of the shield 12 of the coaxial cable 10 toward the trailing end 14 thereof. FIG. 3 shows an enlarged view of the working current I flowing through the core wire 11 of the coaxial cable 10 in a first direction opposite to the direction of the second current i flowing through the shield 12.

Figure 14:
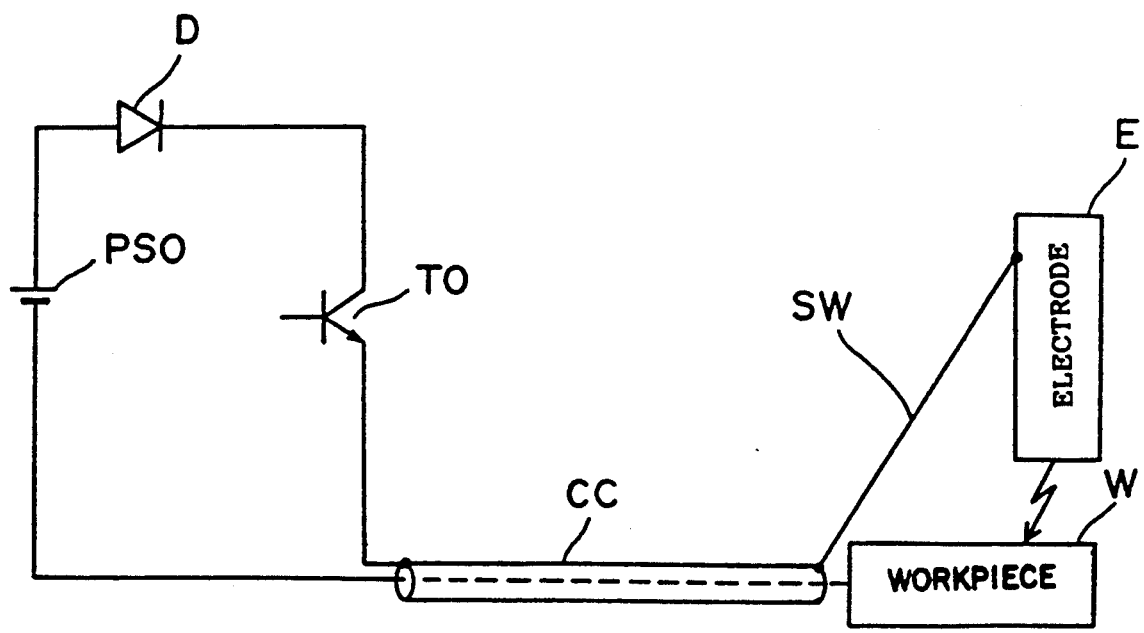
FIG. 14 is a circuit diagram of a discharge working machine according to the prior art.

Because of this steady state condition, the waveform of the working current I rises faster and has sharper peaks as compared with that occurring in the prior art discharge working machine shown in FIG. 14. This increases the peak value of the working current I, thereby enhancing the working speed. For a given working speed with the prior art discharge working machine shown in FIG. 14, the voltage of the power source PSO can be reduced, to thereby decrease the power consumption.

As described above, the coaxial cable 10 is used instead of the single wire SW, and the currents flowing in central portion 11 and outer portion 12 flow in opposite directions so that the peak value of the working current I can be increased. The higher peak value can be achieved because the effective value of the inductance of the power line (second coaxial cable 10) around the working electrode E is decrease in comparison with the inductance of the single wire SW used in the prior art discharge working machine.

Also, by adjusting the length L1 of the shield 12 in the axial direction thereof with respect to the length L2 in FIG. 3, it is possible to adjust the value of inductance occurring in the connection (including the coaxial cable 10 and single wire 26 connected to the core wire 11) used in place of the prior art single wire SW. This adjustment allows the value of inductance obtained in discharge working machines of varying sizes to be adjusted to coincide with the value of inductance which would otherwise be obtained in the single wire SW in the connection for a discharge working machine of the greatest size. Because of this, even though different size discharge working machines are used, they can have the same working speeds.

Also, according to the prior art, the value of inductance in the single wire SW is reduced by increasing the number of the single wires SW. According to the above-mentioned embodiment of the invention, the values of inductance can be matched to each other without increasing the number of coaxial cables used.

Figure 2:
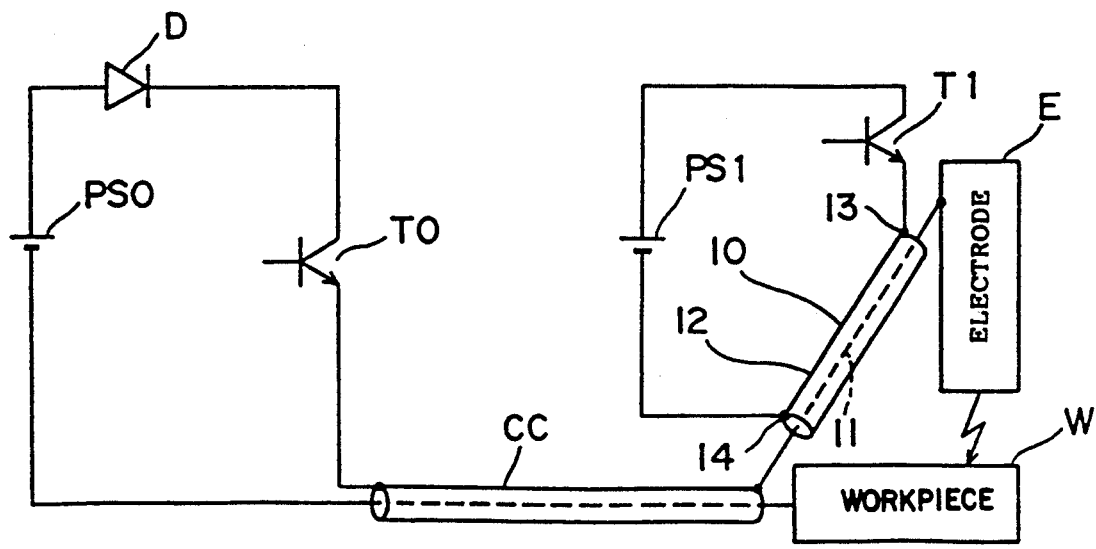
FIG. 2 is a circuit diagram of another embodiment according to the invention.

FIG. 2 shows a circuit diagram of another embodiment of a discharge working machine according to the invention.

The embodiment shown in FIG. 2 is similar to that shown in FIG. 1, but omits the variable resistor VR1 used in the first embodiment in FIG. 1.

Conditions such as the peak value of the working current, the length of the second coaxial cable 10, and the like are determined by setting the voltage of the power source PSI at a given value, as shown in FIG. 2. The variable resistor VRI can be omitted. Alternatively, a fixed resistor may be used in place of the variable resistor VR1. Also, the transistor T1 can be omitted.

Figure 4:
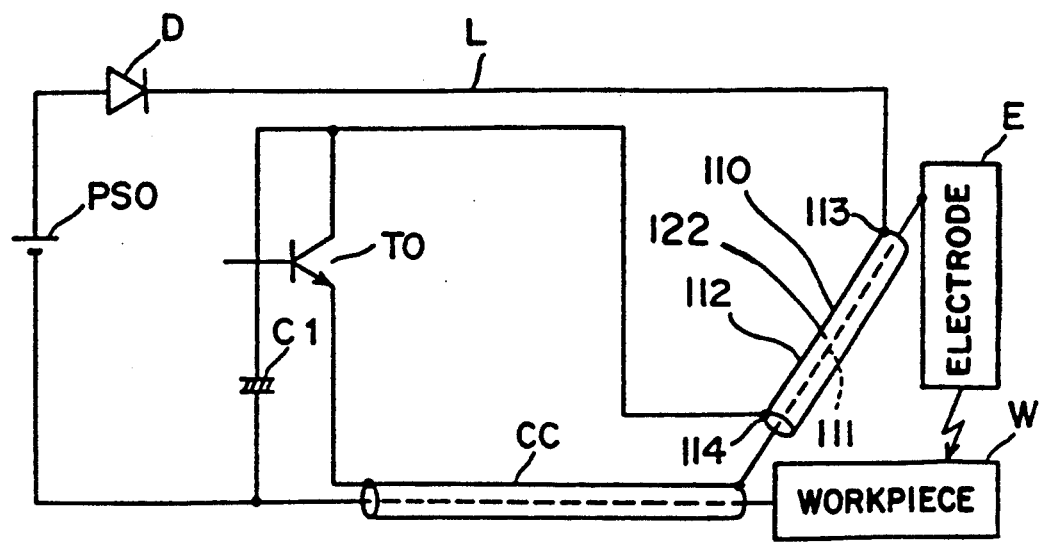
FIG. 4 is a circuit diagram of a further embodiment according to the invention in which a current flowing in the shield of a coaxial cable is supplied from a power line.

FIG. 4 shows a circuit diagram of still another embodiment according to the invention in which the second current to flow through the shield of the second coaxial cable is supplied from a power line.

In this embodiment, instead of the single wire SW in the prior art, there is provided a second coaxial cable 110 which comprises a core wire 111, a shield 112 and an insulator 120 for insulating the core wire 111 and the shield 112 from each other. In this structure, a first current which is a discharge working current flows through the core wire 111. The second current of power line L flows through the shield 112 in a second direction opposite to the first direction of the working current flowing through the core wire 111.

In other words, the shield 112 of the second coaxial cable 110 is included as a part of the power line L extending from a power source PSO through a diode D to a transistor T0, and the direction of flow of the current in the power line L is set to be opposite to the direction of the working current flowing through the core wire 111. Capacitor C1 is used to smooth the power voltage.

In this manner, as the discharge operation is carried out, the second current is allowed to flow through the power line L in a second direction from the leading end 113 of the shield 112 of the coaxial cable 110, and toward the trailing end 114 thereof. The first direction of the working current I flowing through the core wire 111 of the coaxial cable 110 is opposite to that of the current i flowing through the shield 112. This allows a steeper rise of the waveform of the working current I and a higher peak value of the working current I as compared with the prior art apparatus shown in FIG. 14, to thereby enhance the working speed. Also, for a given speed of operation of the prior art machine shown in FIG. 14, the voltage of the power source PSO can be reduced, thereby lowering the power consumption.

The embodiment illustrated in FIG. 4 uses the second current flowing through the power line L having passed through the shield 112 of the coaxial cable 110. This eliminates the need for any means for controlling the timing of the current flowing through the shield 112, which is a further advantage over the prior art apparatus.

Figure 5:
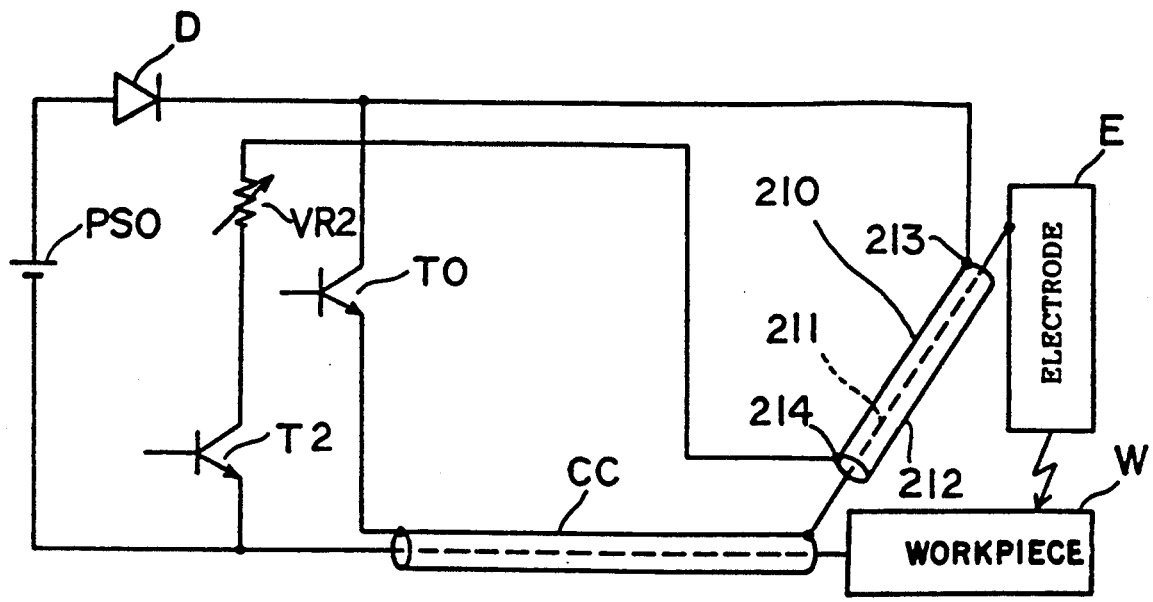
FIG. 5 is a circuit diagram of a still further embodiment according to the invention in which a current is supplied to the shield of the coaxial cable from the power source which supplies the working current.

Referring now to FIG. 5, there is shown a circuit diagram of yet another embodiment according to the invention, in which a second current is supplied to the shield of the second coaxial cable from a power source PSO, which also supplies the working current.

In this embodiment, instead of the single wire SW as in the prior art, there is provided a second coaxial cable 210 comprising a core wire 211, a shield 212, and an insulator for insulating the former two members from each other. A first current which is a discharge working current flows through the core wire 211 in a first direction. Transistor T2 receives a current from a power source PSO to control the on and off cycles of the second current to flow through the shield 212. The second current through the shield 212 flows in the opposite direction of the first current flowing through the core wire 211.

Here, a variable resistor VR2 is used to control the amount of the current flowing through the shield 212.

In other words, the current from the power source PSO is, while under control of the transistor T2, passed through a diode D and variable resistor VR2, and into the shield 212 of the coaxial cable 210. The components of this embodiment are connected such that the direction of the second current flowing into the shield 212 is opposite to the direction of the first current flowing through the core wire 211.

A transistor T0 is shown as an example of first switching means for controlling the on and off cycles of the working current flowing through the core wire 211. The transistor T2 shown as an example of a second switching means for receiving the current from the power source PSO, and for controlling the on and off cycles of the current flowing in the shield 211. Transistor T2 is adapted to turn on and off repetitively in synchronization with the operation of the transistor T0.

In this manner, the transistor T2 turns on and off with the same pulse width and at the same cycle as the repetitive on and off cycles of the transistor T0. When the transistor T0 turns on to start the discharge, the working current is allowed to flow from the coaxial cable CC toward the working electrode E. At that time, since the transistor T2 has turned on, the current is allowed to flow from the leading end 213 of the shield 212 of the coaxial cable 210 toward the trailing end 214 thereof. Therefore, the directions of the working current I flowing through the core wire 211 of the coaxial cable 210 and the current i flowing through the shield 212 of the coaxial cable 210 are opposite to each other.

In this case, when compared with the prior art apparatus shown in FIG. 14, the waveform of the working current I rises more sharply and the peak value of the working current I is increased, thereby enhancing the working speed.

Figure 6:
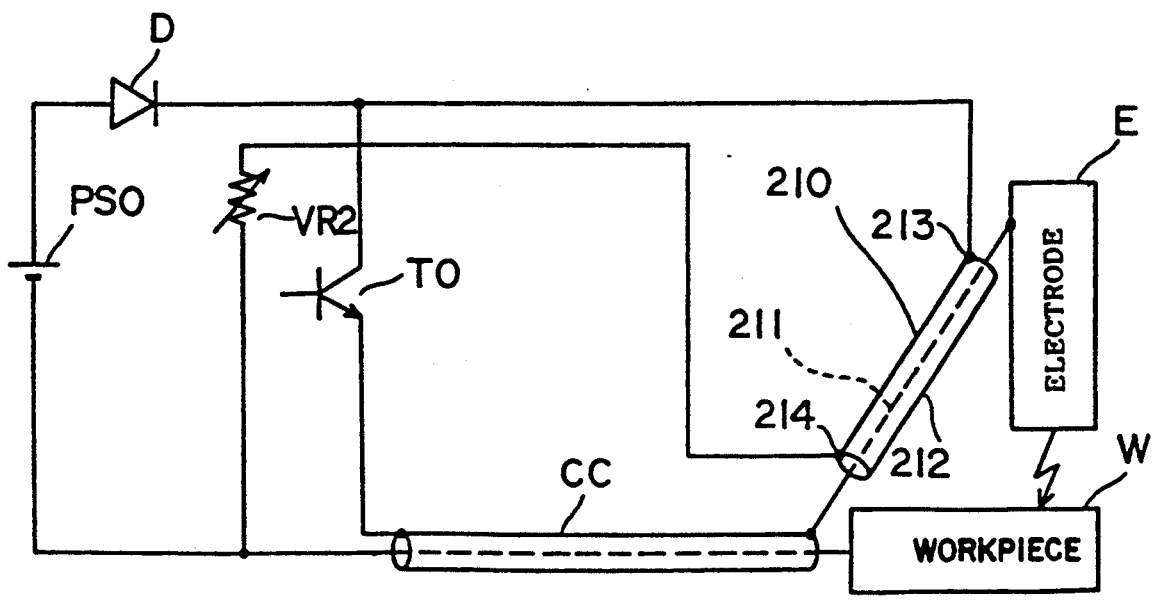
FIG. 6 is a circuit diagram of a modified version of the embodiment shown in FIG. 5, with a transistor T2 being omitted therefrom.

FIG. 6 shows a circuit diagram of a modified version of the embodiment shown in FIG. 5, in which the transistor T2 shown in FIG. 5 is omitted.

FIG. 6 shows another embodiment which forms a loop which is composed of a leading line extending from the cathode side of the diode D up to a shield 212, from shield 212 to a variable resistor VR2, and from the variable resistor VR2 to the earth side of the power source PSO. The current is supplied from the power source PSO, to a resistor, and the current flows into the shield.

In this structure the second current always flows in the shield 212 and while discharge is occurring between the electrode E and the workpiece W inductance between the coaxial cable CC and the electrode E can be reduced. For this reason, the working speed can be improved.

It should be noted here that the variable resistor VR2 may be replaced by a fixed resistor.

Figure 7:
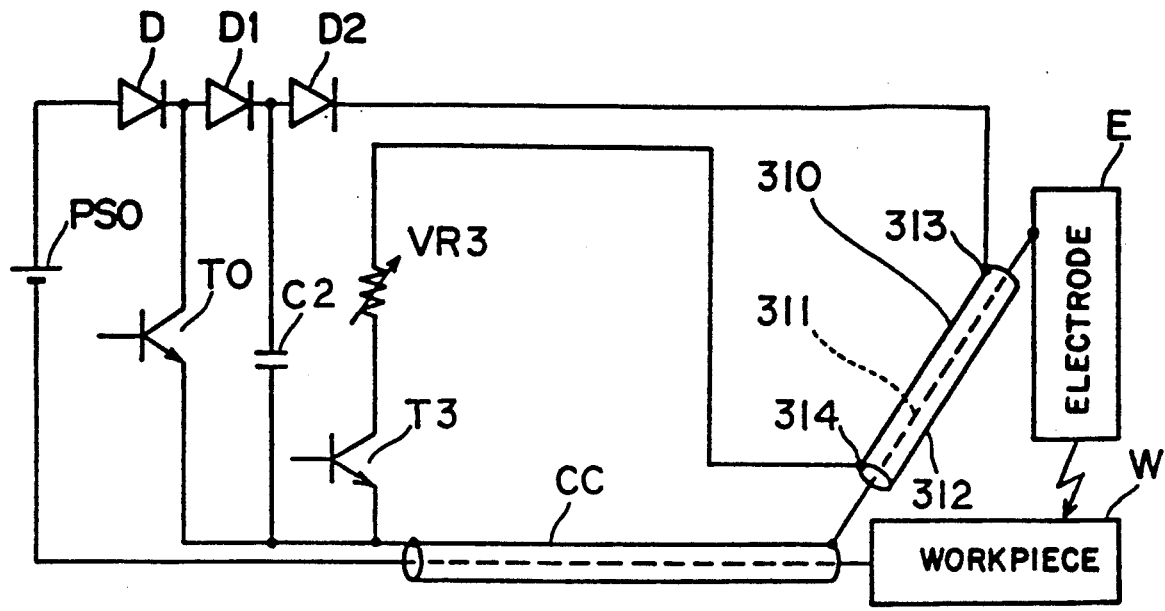
FIG. 7 is a circuit diagram of another embodiment according to the invention in which a current is generated in the shield of the coaxial cable from a capacitor charged with surge energy.

Referring next to FIG. 7, there is shown a circuit diagram of a further embodiment according to the invention in which a second current flows into the shield of a second coaxial cable from a capacitor charged with surge energy.

In this embodiment, instead of the single wire SW according to the prior art apparatus, there is provided a second coaxial cable 310 comprising a core wire 311, a shield 312 and an insulator for insulating the other two components from each other. A first current which is a working current flows into the core wire 311, a transistor T0 is used to control the on and off cycles of the working current flowing through the core wire 311, and the surge energy that is generated in the transistor T0 is absorbed by a capacitor C2. The electric charge accumulated in capacitor C2 is supplied to the shield 312, and is controlled so that the second current in the shield 312 flows in the opposite direction to the first current flowing through the core wire 311.

In other words, the transistor T0 controls the on and off cycles of the working current flowing through the core wire 311, the capacitor C2 absorbs the surge energy generated by transistor T0, and transistor T3 controls the supply of the electric charge from capacitor C2 to the shield 312, so that the direction of the second current flowing into the shield 312 can be opposite to that of the first current flowing through the core wire 311.

In this embodiment, diodes D1 and D2 are used to prevent reverse currents, and a variable resistor VR3 is used to control the amount of the second current flowing into the shield 312. Also, the transistor T0 is shown as an example of first switching means which controls the on and off cycles of the working current flowing through the core wire. The capacitor C2 is a capacitor which is capable of absorbing the surge energy occurring in the first switching means, and the transistor T3 is an example of second switching means for controlling the supply of the electric charges into the capacitor C2 to the shield 312.

In this structure, the transistor T3 turns on and off repetitively with the same pulse width and at the same cycle as the repetitive on and off cycles of the transistor T0. Surge energy is generated when the transistor T0 turns on, the surge energy being absorbed by the capacitor C2. Immediately after the turn on of transistor T0, the transistor T3 turns on, so that the current stored in capacitor C2 is allowed to flow into the shield. The turn on of transistor T3 can be delayed by a capacitor or delay line, for instance, connected to its base. The value of the current can be controlled by adjusting the variable resistor VR3.

When transistor T0 turns on to thereby start the discharge, the working current flows from the coaxial cable CC toward the working electrode E. At the same time, since transistor T3 turns on, the second current flows from the leading end 313 of the shield 312 of the second coaxial cable 310 toward the trailing end 314 thereof. This produces the current flow as shown in FIG. 3, the direction of the working current I flowing through the core wire 311 of the second coaxial cable 310 is opposite to the direction of the second current i flowing through the shield 312. In this case, when compared with the prior art apparatus shown in FIG. 14, the rise-time of the waveform of the working current I is improved and the peak value of the working current I is greater, with the result that the working speed an be increased.

Figure 8:
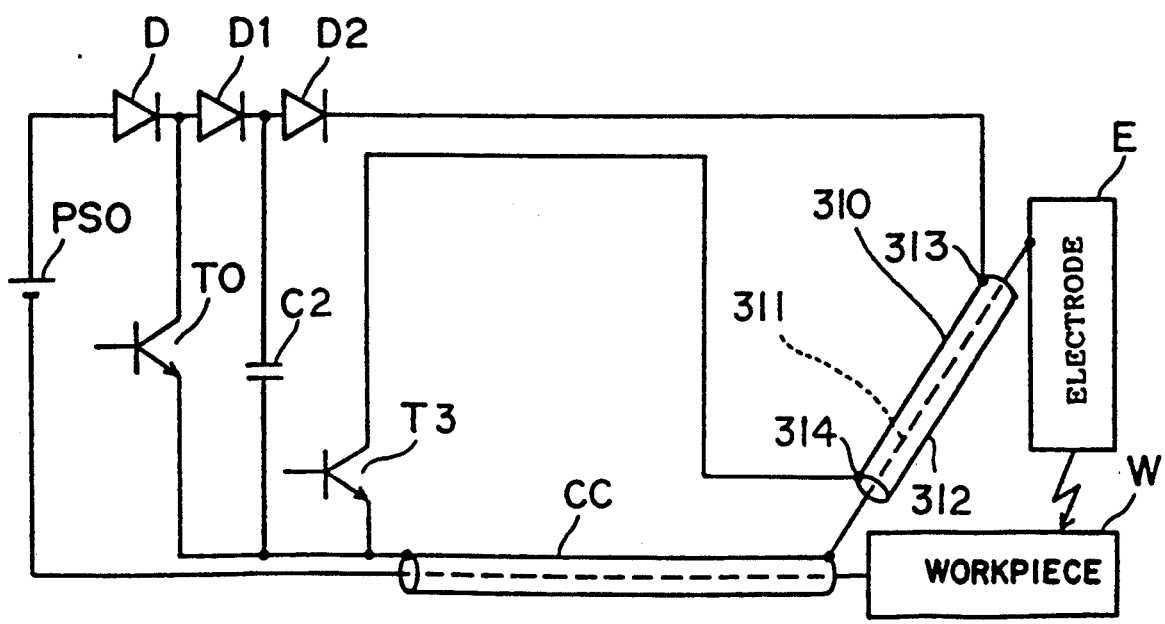
FIG. 8 is a circuit diagram of a modified version of the embodiment shown in FIG. 7, with the variable resistor VR2 omitted therefrom.

FIG. 8 shows a circuit diagram of a modification of the embodiment shown in FIG. 7, in which the variable resistor VR3 is omitted from the embodiment in FIG. 7.

In order to increase the value of the second current flowing into the shield 312, the value of the capacitor C2 may be increased and, in order to decrease the value of the second current flowing into the shield 312, the value of the capacitor C2 may be decreased. Because of this structure, even if the variable resistor VR3 is omitted, the value of the second current flowing into the shield 312 can be controlled to some extent.

This allows the inductance between the coaxial cable CC and the electrode E to be reduced, so that the working speed can be improved.

Figure 9:
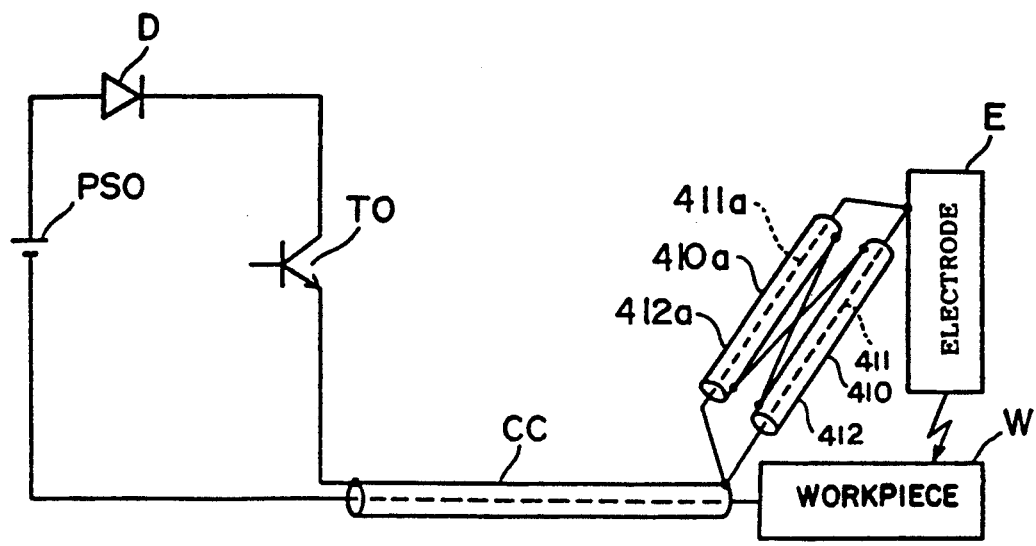
FIG. 9 is a circuit diagram of still another embodiment according to the invention which uses two coaxial cables connected in parallel to each other, instead of a single wire SW according to the prior art.

FIG. 9 shows a circuit diagram of a still further embodiment according to the invention in which, instead of the single wire SW according to the prior art, two coaxial cables which are connected in parallel to each other are used.

Figure 10:
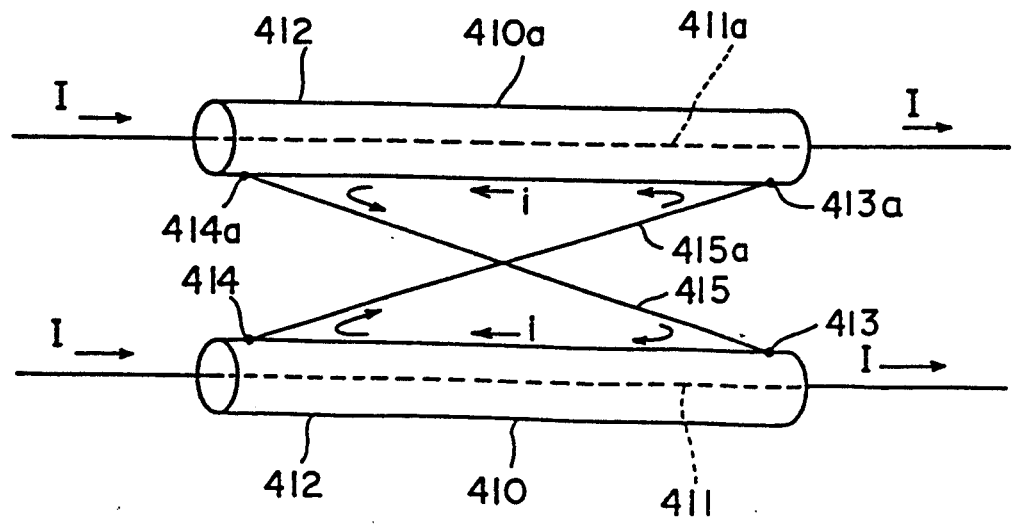
FIG. 10 is an enlarged view of the two coaxial cables shown in FIG. 9.

FIG. 10 shows an enlarged view of the two coaxial cables shown in FIG. 9.

In this embodiment, the core wires 411 and 411a of first and second coaxial cables 410 and 410a are connected in parallel to each other, the shields 412 and 412a of the coaxial cables 410 and 410a are connected in series to each other. The two parallel-connected core wires 411 and 411a are used instead of the single wire SW used in the prior art. The leading end 41 of the shield 412 of the coaxial cable 410 is connected to the trailing end 414a of the shield 412a of the coaxial cable 410a by lead wire 415 and the trailing end 414 of the shield 412 of the coaxial cable 410 is connected to the leading end 413a of the shield 412a of the coaxial cable 410a by lead wire 415a.

The core wire of the first coaxial cable CC is connected to the workpiece W, and the shield of the first coaxial cable CC is connected to the working electrode E through the parallel-connected core wires 411, 411a of the coaxial cables 410, 410a.

When transistor T0 turns on and discharge is initiated, the working current is allowed to flow from the first coaxial cable CC toward the working electrode E through the core wires 411, 411a of the coaxial cables 410, 410a. Due to the working current I that flows through the core wire 411 of the coaxial cable 410, an induced voltage is generated in the shield 412 thereof, and, since the shield 412 cooperates with the lead wires 415, 415a and the shield 412a in forming a loop, the induced voltage allows an induced current i to flow. Also, the induced current i flows in the opposite direction to that of the working current I.

On the other hand, due to the working current I flowing through the core wire 411a of the coaxial cable 410a, another induced voltage is generated in the shield 412a. Since the shield 412a cooperates with the lead wires 415, 415a and the shield 412 in forming a loop, the induced voltage allows another induced current i to flow. Similarly, the current path of the induced current i is opposite to that of the working current I.

In this case, when compared with the prior art apparatus shown in FIG. 14, the rise-time of the waveform of the working current I becomes sharper and the peak value of the working current I is increased, so that the working speed can be enhanced.

Figure 11:
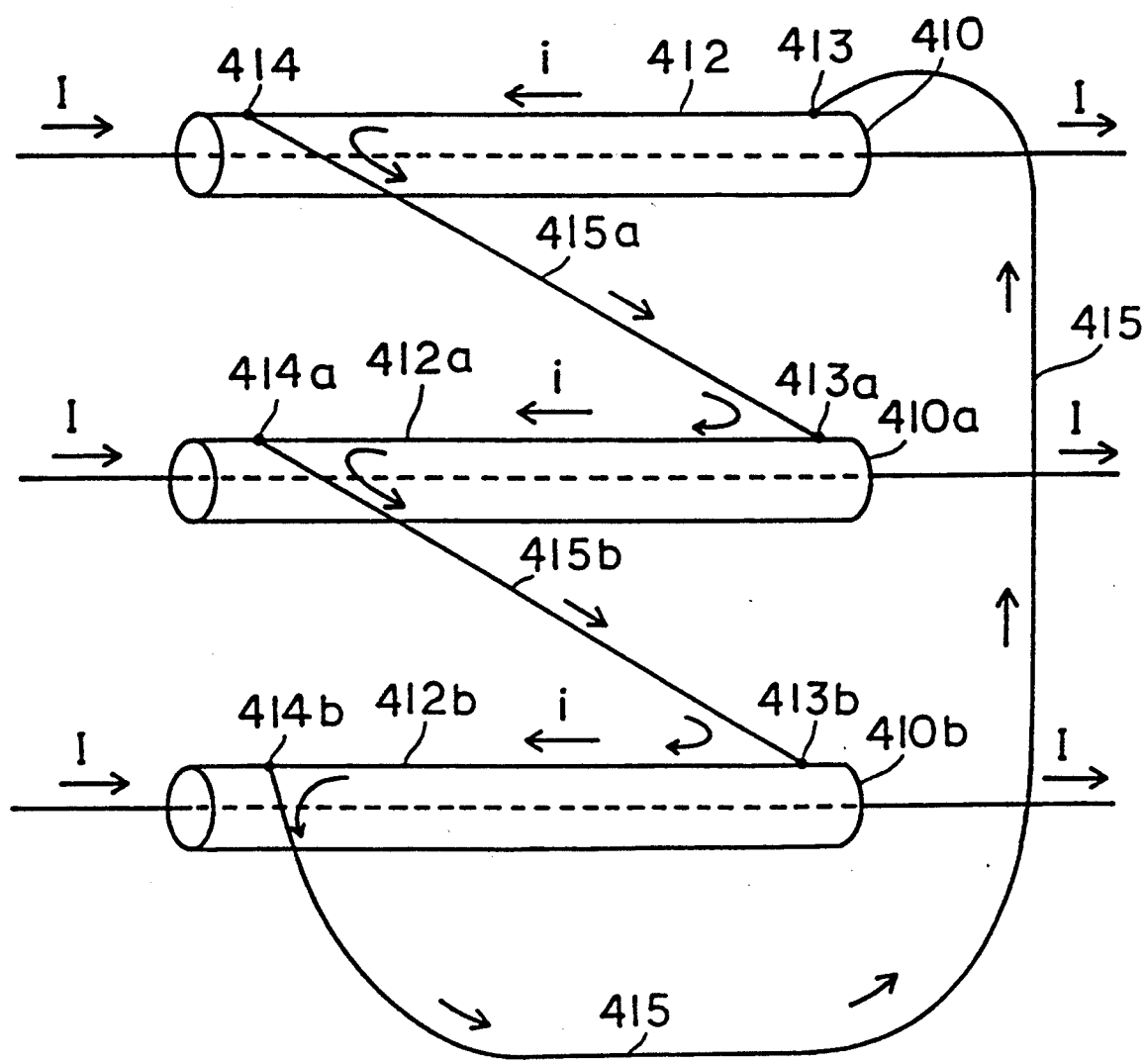
FIG. 11 is a circuit diagram of yet another embodiment according to the invention which uses three coaxial cables connected in parallel to one another, instead of the single wire SW according to the prior art.

FIG. 11 shows a circuit diagram of another embodiment according to the invention which, instead of the single wire SW according to the prior art, uses three coaxial cables connected in parallel to one another.

In this embodiment, the trailing end 414 of a shield 412 of a coaxial cable 410 is connected to the leading end 43a of a shield 412a of a coaxial cable 410a by means of a lead wire 415a, the trailing end 414a of the shield 412a of the coaxial able 410a is connected to the leading end 413a of a shield 412b of a coaxial cable 410b by means of a lead wire 415b, and the trailing end 414b of the shield 412b of the shield 412 of the coaxial cable 410 by means of a lead wire 415.

In this case, the core wire of the first coaxial cable CC is connected to the workpiece W and the shield of the first coaxial cable is connected to the working electrode E by means of the core wires 411, 411a and 411b of the second coaxial cables 410, 410a and 410b.

Although the two or three coaxial cables are employed in the above-mentioned embodiments of the invention, four or more coaxial cables can be used, provided that the core wires of the four or more coaxial cables are connected in parallel to one another and that the shields of the four or more coaxial cables are connected in series to one another.

Figure 12:
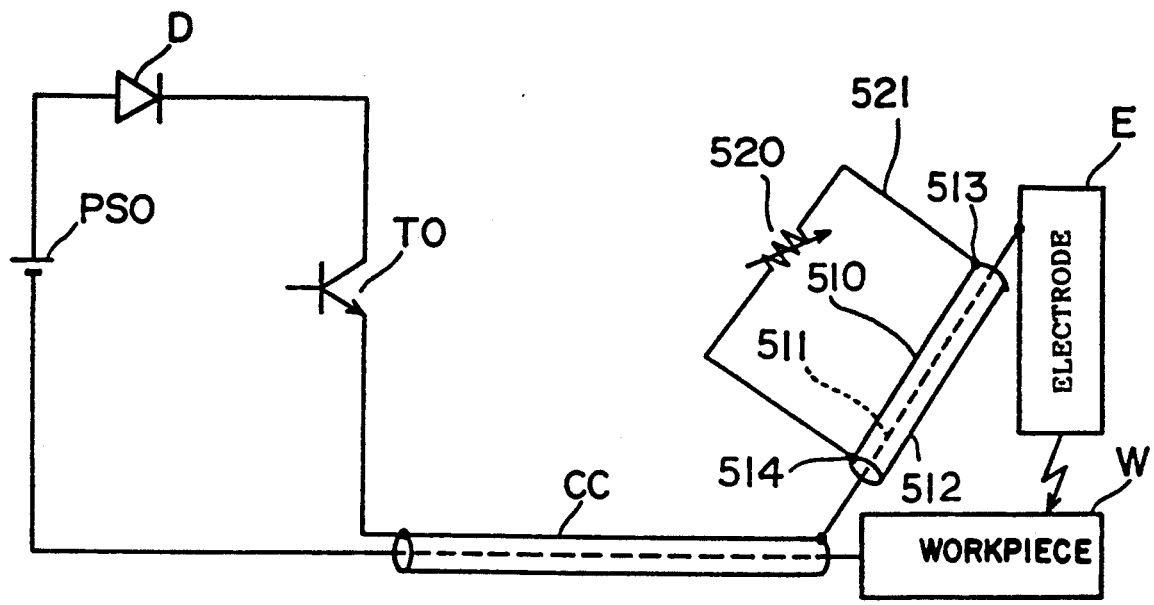
FIG. 12 is a circuit diagram of a further embodiment according to the invention in which a current is generated in the shield of the coaxial cable by means of induced voltage.

Referring next to FIG. 12, there is shown a circuit diagram of still another embodiment according to the invention in which a current flows into the shield of the second coaxial cable only by means of an induced voltage.

In this embodiment, in place of the single wire SW used in the prior art apparatus, there is employed a core wire 511 of a second coaxial cable 510, the leading end 513 of a shield 512 of the coaxial cable 510 is connected to the trailing end 514 thereof by means of a lead wire (a conductor) 521, and variable resistor 520 connected in series to the lead wire 521.

The variable resistor 520 is used to adjust the value of a current flowing through the shield 512. The lead wire 521 is only one example of one of many structures which can be used as the conductor.

Transistor T0 turns on to start the initial discharge, causing a working current to flow from the first coaxial cable CC toward the working electrode E. This working current I flows into the core wire 511 of the second coaxial cable 510. At that time, due to the working current I flowing through the core wire 511 of the coaxial cable 510, an induced voltage is generated in the shield 512 thereof. Since the shield 512 cooperates with the lead 521 and variable resistor 520 in forming a loop, the induced voltage allows an induced current i to flow. Also, the direction of flow of the induced current i is opposite to that of the working current I.

According to this embodiment, when compared with the prior art apparatus shown in FIG. 14, the rise-time of the waveform of the working current I is improved (becomes sharper) and the peak value of the working current I is increased, thereby enhancing the working speed.

Figure 13:
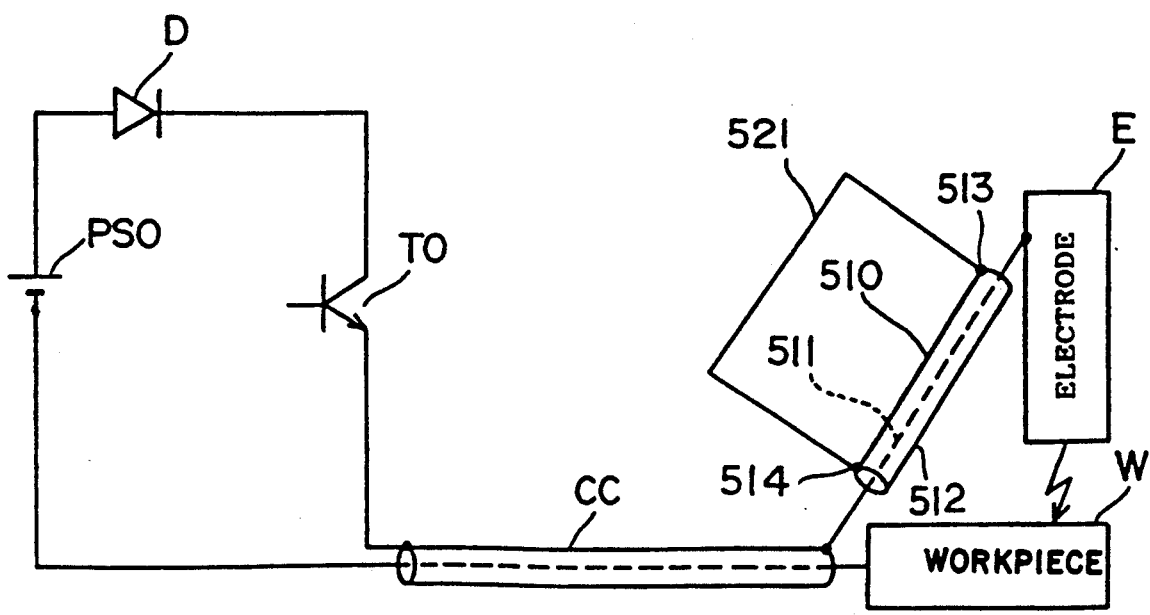
FIG. 13 is a circuit diagram of a modified version of the embodiment shown in FIG. 12, with a variable resistor 20 being omitted therefrom.

Alternatively, in place of the variable resistor 520 used in the above embodiment, a fixed resistor may be used, or, the variable resistor 520 or fixed resistor may be omitted. As shown in FIG. 13, the loop may be formed only bY the shield 512 and lead wire 521.

As in the circuit of FIGS. 1 or 2, the connection means used in place of the single wire SW of the prior art apparatus may be used the core wire of the first coaxial cable CC and the workpiece W.

Also, instead of the above-mentioned transistors T0, T1, T2 and T3, any other switching elements may be employed.

Further, the portion that is connected to the core wire of the coaxial cable CC may be connected to the shield thereof and the portion connected to the shield of the coaxial cable CC may be connected to the core wire thereof.

Although in the above-mentioned embodiments the lead wires are connected to the end portions (leading and trailing ends) of the shields such as the shield 12, the lead wires can be connected to other portions thereof.

In addition, current may flow into the shield of the coaxial cable by alternate means from those disclosed in the above-mentioned embodiments.

While the preferred embodiment has described operation using a discharge working machine, many other devices may be used to practice the invention.

All such modifications are intended to be encompassed within the following claims.

What is claimed is:

1. A connection for a discharge working machine using a first current which is supplied from a power source to a workpiece through an electrode, comprising:
    a first coaxial cable having a first core wire, a first shield, and a first insulator for insulating between the first core wire and first shield, the core wire connecting the power source to the workpiece;
    a second coaxial cable having a second core wire, a second shield, and a second insulator for insulating between the second core wire and second shield, the second core wire connecting the first shield to the electrode;
    said second coaxial cable having the first current flowing in a first direction through the second core wire and a second current flowing in a second direction opposite to said first direction in the second shield.

2. A connection as in claim 1, further comprising means for supplying power to said second coaxial cable, connected such that the first current flows in the first direction through said core, and said second current flows in the second direction opposite to said first direction through said shield.

3. A connection as in cable 2, wherein said power supplying means includes a single power supply connected such that said second current flows in said second direction through said shield of the second coaxial cable, and said first current flows through the shield of the first coaxial cable, and from said shield of said first coaxial cable to said core of the second coaxial cable to flow therethrough.

4. A connection as in claim 2, wherein said power supplying means includes two separate power supplies.

5. A connection as in claim 4, wherein one of said two separate power supplies is a capacitor, charged by surge currents caused during switching.

6. A connection for a discharge working machine in which a first current is supplied from a power source to a workpiece through a working electrode, comprising:
    a first coaxial cable comprising a core wire, a shield and an insulator for insulating the core wire and the shield from each other, the core wire connecting the power source to the workpiece;
    a second coaxial cable having a core wire, a shield, and an insulator for insulating between the core wire and shield, the core wire connecting the shield of said first coaxial cable to the electrode;
    a lead wire for connecting a portion of said shield to another portion of said shield, wherein said shield and said lead wire form a loop; and
    a resistor connected in series along said loop.

7. A discharge working machine, comprising:
    a working electrode;
    a power supply means for supplying a first current to said working electrode;
    a first coaxial cable having a core wire, a shield, and an insulator for insulating between the core wire and shield, the core wire connecting the power source to the workpiece;
    a second coaxial cable having a core wire, a shield, and an insulator for insulating between the core wire and shield, the core wire connecting the shield of said first coaxial cable to the electrode;
    said second coaxial cable connected to said power supply means to have a first current flowing in a first direction through said core and a second current flowing in a second direction opposite to said first direction in said shield.

8. A connection for supplying power, comprising:
    a coaxial cable, having a core wire, and a shield which is insulated from the core wire; and
    means for supplying power to said coaxial cable, connected such that a first current flows in a first direction through said core, and a second current flows in a second direction opposite to said first direction through said shield, wherein said power supplying means includes two separate power supplies.

9. A connection as in claim 8, wherein one of said two separate power supplies is a capacitor, charged by surge currents caused during switching.

10. A connection for a discharge working machine, comprising:
    a first power source for supplying a working current;
    a coaxial cable having a core wire, a shield, and an insulator for insulating the core wire and shield from each other, said coaxial cable being connected to said first power source such that current from said first power source flows through said core wire in a first direction; and
    a second power source, provided separately from said first power source, connected to produce a current in the shield flowing in a second direction which is opposite to said first direction.

11. A connection for a discharge working machine as set forth in claim 10, further comprising a resistor connected in series with said second power source.

12. A connection for a discharge working machine as set forth in claim 10, further comprising a switching element connected in series with said second power source for synchronization with the first current from said first power source.

13. A connection for a discharge working machine in which a first current is supplied from a power source to a workpiece through an electrode, comprising:
   a first coaxial cable, having a core wire and a shield, the core wire connecting the power source to the workpiece;
   a second coaxial cable having a core wire and a shield, the core wire connecting the shield of said first coaxial cable to the electrode;
   said power source supplying the first current to said electrode and said workpiece through said second coaxial cable core wire, and said shield of said second coaxial cable receiving a second current flowing in a second direction which is opposite to the direction of the first current flowing through said second coaxial cable core wire.

14. A connection for a discharge working machine in which a working current is supplied from a power source to a working electrode and a workpiece, comprising:
   a coaxial cable comprising a core wire, a shield and an insulator for insulating the core wire and the shield from each other;
   first switching means, connected to said power source, for controlling on and off cycles of working current to flow through said core wire in a first direction; and
   second switching means, responsive to a current from said power source, for controlling on and off cycles of a current to flow into said shield in a second direction opposite said first direction.

15. A connection for a discharge working machine in which a first current is supplied from a power source to a working electrode and a workpiece, comprising:
   a coaxial cable comprising a core wire, a shield, and an insulator for insulating the core wire and the shield from each other; and
   switching means, responsive to the first current from said power source, for controlling on and off cycles of said first current to flow through said core wire in a first direction, and including a resistor for controlling a second current flowing into said shield in a second direction which is the opposite of the first direction.

16. A discharge working machine in which a first current is supplied from a power source to a workpiece through a working electrode, comprising:
   a first coaxial cable comprising a core wire, a shield, and an insulator for insulating the core wire and the shield from each other, the core wire connecting the power source to the workpiece;
   a second coaxial cable having a core wire, a shield, and an insulator for insulating between the core wire and shield, the core wire connecting the shield of said first coaxial cable to the electrode;
   first switching means for controlling the flow of the first current in a first direction through the core wire of said second coaxial cable;
   a capacitor for storing a surge energy generated in said first switching means; and
   second switching and setting means, coupled to said capacitor, for controlling a supply of the surge energy stored in said capacitor to said shield of the second coaxial cable, and for setting a second direction of a second current flowing through said second coaxial cable shield to be opposite to the first direction of the first current flowing through said second coaxial cable core wire.

17. A discharge working machine as set forth in claim 16, further comprising a resistor connected in series to said second switching means.

18. A connection for a discharge working machine in which a first current is supplied from a power source to a workpiece through a working electrode, comprising:
   a first coaxial cable comprising a core wire, a shield, and an insulator for insulating the core wire and the shield from each other, the core wire connecting the power source to the workpiece;
   a plurality of second coaxial cables each comprising a core wire, a shield and an insulator for insulating the core wire and shield from each other, the core wires of each of said plurality of second coaxial cables being connected in parallel to one another, and the shields of said plurality of second coaxial cables being connected in series to one another, the first current flowing from said power source to said working electrode and workpiece through said second coaxial cable core wires.

19. A connection as in claim 18 further comprising means for supplying said first current through said second coaxial cable core wires in a first direction, and for supplying a second current through said series connected shields of the second coaxial cables in a second direction opposite to said first direction.

20. A connection for a discharge working machine, comprising:
   a power source for supplying a first current to a workpiece;
   a first coaxial cable comprising a core wire, a shield, and an insulator for insulating the core wire and the shield from each other, the core wire connected between the power source and the workpiece in a way such that said current flows therethrough in a first direction;
   a second coaxial cable and a third coaxial cable each comprising a core wire, a shield, and an insulator for insulating the core wire and shield form each other, the core wire of said second coaxial cable being connected in parallel to the core wire of said third coaxial cable, a leading end of the shield of said second coaxial cable being connected to a trailing end of the shield of said third coaxial cable, and a trailing end of the shield of said second coaxial cable being connected to a leading end of the shield of said third coaxial cable and said second and third coaxial cables connected between the power source and the workpiece in a way such that said current flows through both said core wires in a same direction.

21. A connection for a discharge working machine in which a first current is supplied from a power source to a workpiece through a working electrode, comprising:
   a first coaxial cable comprising a core wire, a shield, and an insulator for insulating the core wire and the shield from each other, the core wire connecting the power source to the workpiece;
   a second coaxial cable having a core wire, a shield, and an insulator for insulating between the core wire and shield, the core wire connecting the shield of said first coaxial cable to the electrode; and
   a lead wire for connecting a portion of said shield of said second coaxial cable to another portion of said shield of said second coaxial cable, wherein said shield and said lead wire form an uninterrupted loop.

22. A connection as in claim 21, further comprising means for supplying power to said second coaxial cable, connected such that a first current flows in a first direction through said second coaxial cable core, and a second current flows in a second direction opposite to said first direction through said second coaxial cable shield.

* * * * *